(12) United States Patent
Okada et al.

(10) Patent No.: US 11,314,119 B2
(45) Date of Patent: *Apr. 26, 2022

(54) LENS, LENS BLANK, AND EYEWEAR

(71) Applicant: Mitsui Chemicals, Inc., Tokyo (JP)

(72) Inventors: Yoshinobu Okada, Niihama (JP);
Eiichiro Hikosaka, Nagoya (JP);
Toshifumi Hino, Saijo (JP); Akifumi Aono, Nagoya (JP); Akihiro Muramatsu, Marugame (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/090,995

(22) Filed: Nov. 6, 2020

(65) Prior Publication Data

US 2021/0055602 A1    Feb. 25, 2021

Related U.S. Application Data

(63) Continuation of application No. 16/484,145, filed as application No. PCT/JP2017/036126 on Oct. 4, 2017, now Pat. No. 10,859,865.

(30) Foreign Application Priority Data

Feb. 7, 2017    (JP) .............................. JP2017-020635

(51) Int. Cl.
*G02F 1/1335*    (2006.01)
*G02F 1/1339*    (2006.01)
(Continued)

(52) U.S. Cl.
CPC ...... *G02F 1/133504* (2013.01); *G02F 1/1339* (2013.01); *G02F 1/13439* (2013.01);
(Continued)

(58) Field of Classification Search
CPC ............. G02F 1/133504; G02F 1/1339; G02F 1/13439

See application file for complete search history.

(56) References Cited

U.S. PATENT DOCUMENTS 6,626,532 B1    9/2003   Nishioka et al.
8,317,321 B2    11/2012  Haddock
(Continued)

FOREIGN PATENT DOCUMENTS

JP    2009-098641 A    5/2009
JP    2010532496 A     10/2010
(Continued)

OTHER PUBLICATIONS

International Search Report from International Application No. PCT/JP2017/036126 dated Dec. 5, 2017.

*Primary Examiner* — Dung T Nguyen
(74) *Attorney, Agent, or Firm* — Brundidge & Stanger, P.C.

(57) ABSTRACT

A lens includes: a substrate that includes a diffraction region where a plurality of protruding strips are coaxially and alternately formed. The diffraction region includes a first diffraction region and a second diffraction region that is located in at least a part of a region different from the first diffraction region. The second diffraction region includes: groove spaces lying between adjacent ones of the protruding strips with one another; and a communication space communicating between adjacent ones of the groove spaces with one another.

5 Claims, 12 Drawing Sheets

(51) Int. Cl.
*G02F 1/1343* (2006.01)
*G02C 7/08* (2006.01)
(52) U.S. Cl.
CPC ......... *G02C 7/083* (2013.01); *G02C 2202/20* (2013.01); *G02F 2201/305* (2013.01)

(56) References Cited

U.S. PATENT DOCUMENTS

| | | | |
|---|---|---|---|
| 10,859,865 B2 * | 12/2020 | Okada | G02F 1/1339 |
| 2006/0164593 A1 | 7/2006 | Peyghambarian | |
| 2009/0046349 A1 | 2/2009 | Haddock et al. | |
| 2009/0256977 A1 | 10/2009 | Haddock et al. | |
| 2019/0346697 A1 | 11/2019 | Kan | |

FOREIGN PATENT DOCUMENTS

| | | | |
|---|---|---|---|
| JP | 2011516927 A | 5/2011 | |
| JP | 2012123041 A | 6/2012 | |
| JP | 2012128106 A | 7/2012 | |

* cited by examiner

LENS, LENS BLANK, AND EYEWEAR

CROSS REFERENCE TO RELATED APPLICATIONS

The present application is a continuation of application Ser. No. 16/484,145, filed Aug. 7, 2019, which claims the benefit of priority from Japanese Patent Application No. 2017-020635, filed Feb. 7, 2017, the disclosure of which is incorporated herein in its entirety by reference.

TECHNICAL FIELD

The present invention relates to a lens, a lens blank including the lens, and an eyewear including the lens.

BACKGROUND ART

In recent years, an electronic device worn by a user has been developed. Examples of the electronic device include an eyewear (for example, electronic glasses) including a region in which a focal length is switchable by a voltage (for example, see PTL 1).

Each of lenses of the above-described eyewear includes a first transparent substrate including a first transparent electrode disposed on one of surfaces, a second transparent substrate including a second transparent electrode disposed on one of surfaces, and a liquid crystal layer disposed between the first transparent electrode and the second transparent electrode. More specifically, a diffraction region where a plurality of protruding strips are coaxially formed is located on at least a part of the first transparent substrate. The liquid crystal layer is disposed at a position corresponding to the diffraction region.

For example, each of the lenses can be manufactured in such a manner that the first transparent substrate and the second transparent substrate are superimposed on each other and an adhesive is cured while a liquid crystal material is provided to the diffraction region of the first transparent substrate (first transparent electrode) and the adhesive is provided to a region other than the diffraction region of the first transparent substrate. The liquid crystal material is contained in spaces (hereinafter, groove spaces) existing among the adjacent protruding strips. As a result, the liquid crystal layer can be disposed between the first transparent electrode and the second transparent electrode.

CITATION LIST

Patent Literature

PTL 1
Japanese Unexamined Patent Application Publication (Translation of PCT Application) No. 2010-532496

SUMMARY OF INVENTION

Technical Problem

In a case where the above-described adjacent groove spaces do not communicate with one another in the diffraction region, the liquid crystal material cannot move inside the adjacent groove spaces. Therefore, if the liquid crystal material is not appropriately provided over the entire diffraction region, the groove space not containing the liquid crystal material is generated between the first transparent substrate and the second transparent substrate.

An object of the present invention is to provide a lens for eyewear, in which the liquid crystal material is appropriately disposed between the first transparent substrate and the second transparent substrate, a lens blank including the lens, and an eyewear including the lens.

Solution to Problem

A lens for eyewear according to the present invention includes: a first transparent substrate that includes a diffraction region where a plurality of protruding strips and a plurality of grooves are coaxially and alternately formed; a second transparent substrate that faces the first transparent substrate in a predetermined direction; a liquid crystal layer that is provided in a space between the diffraction region and the second transparent substrate; and a first transparent electrode and a second transparent electrode that apply a voltage to the liquid crystal layer, in which: the diffraction region includes a first diffraction region and a second diffraction region that is located in at least a part of a region different from the first diffraction region, and the space includes groove spaces and a communication space, the groove spaces lying between the grooves and the second transparent substrate, the communication space lying between at least a part of the protruding strips and the second transparent substrate in the second diffraction region and communicating between adjacent ones of the groove spaces with one another.

A lens blank according to the present invention includes: a blank portion; and the abovementioned lens formed integrally with the blank portion.

An eyewear according to the present invention includes the abovementioned lens; a frame that holds the lens; and a control section that controls a voltage between the first transparent electrode and the second transparent electrode to control optical characteristics of the liquid crystal layer of the lens.

Advantageous Effects of Invention

The present invention makes it possible to provide a lens for eyewear, in which a liquid crystal material is appropriately disposed between a first transparent substrate and a second transparent substrate, a lens blank including the lens, and an eyewear including the lens.

DESCRIPTION OF EMBODIMENTS

Embodiment 1

Embodiment 1 according to the present invention is described in detail below with reference to accompanying drawings. In the following description, as a representative example of an eyewear according to the present invention, electronic glasses including lenses each including an electrically active region where optical characteristics are electrically controllable, are described.

[Configuration of Electronic Glasses]

Figure 1:
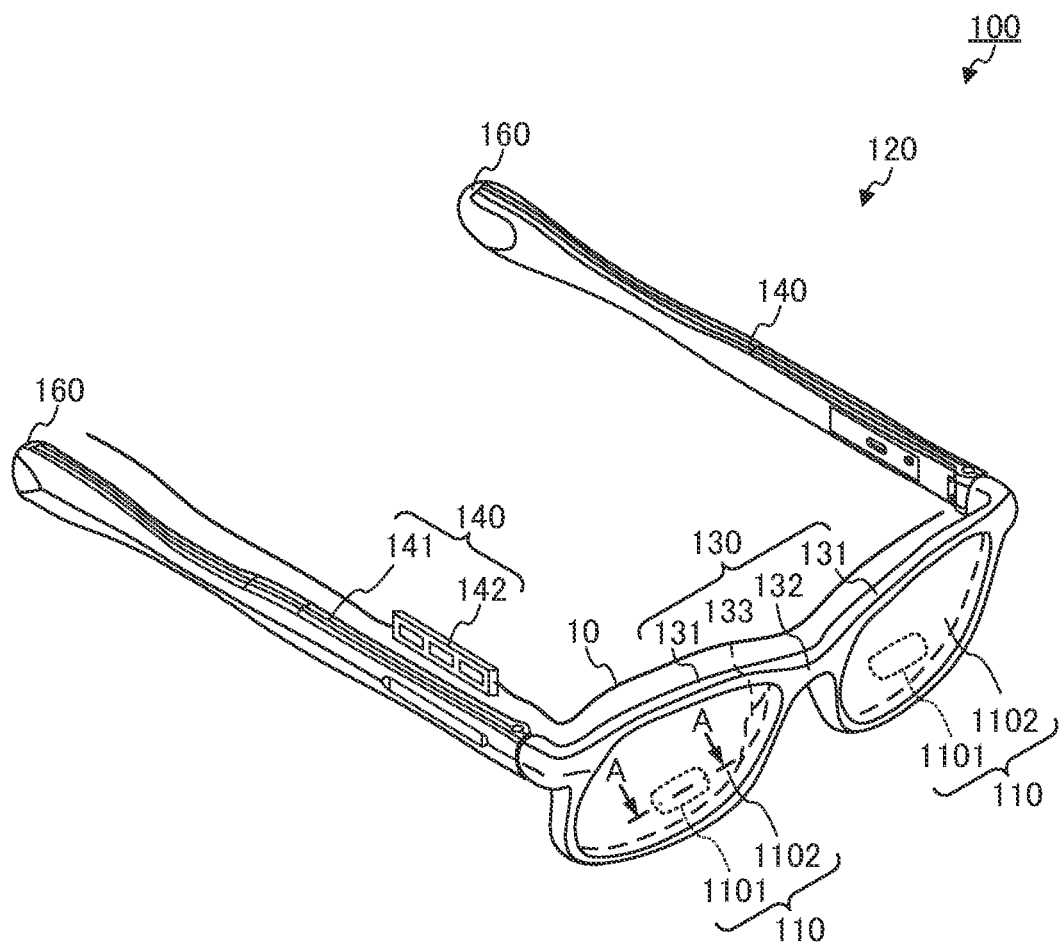
FIG. 1 is a perspective view illustrating an example of a configuration of electronic glasses according to Embodiment 1.
Figure 2:
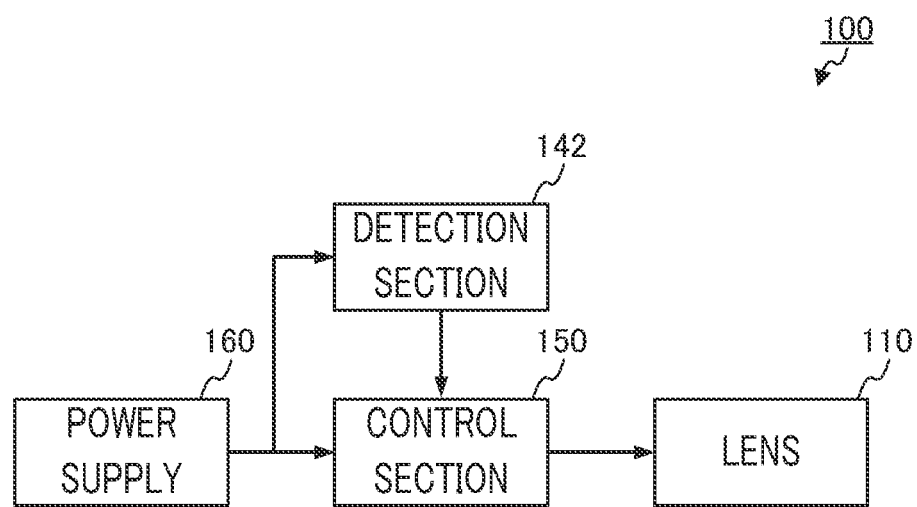
FIG. 2 is a block diagram illustrating an internal circuit of the electronic glasses according to Embodiment 1.

FIG. 1 is a diagram illustrating a developed state of electronic glasses 100 according to the present embodiment, and is a perspective view illustrating an example of a configuration of electronic glasses 100. FIG. 2 is a block diagram illustrating an internal circuit of electronic glasses 100 according to the present embodiment. Electronic glasses 100 include paired lenses 110, frame 120, control section 150 (see FIG. 2), and power supply 160. Frame 120 includes front 130 and paired temples 140. Note that, in the following description, a portion where front 130 is located is regarded as a front surface (front side) of electronic glasses 100. Note that, in FIG. 1, right-side temple 140 is illustrated in an exploded manner.

Further, in the following description for electronic glasses 100 and members constituting electronic glasses 100, "front-rear direction", "width direction", and "top-bottom direction" indicate respective directions of electronic glasses 100 in the developed state (in a state illustrated in FIG. 1) at which a user can wear electronic glasses 100 as glasses, unless otherwise noted. More specifically, the front-rear direction of electronic glasses 100 indicates a front-rear direction of the user when the user wears electronic glasses 100. Further, the width direction of electronic glasses 100 indicates a right-left direction of the user when the user wears electronic glasses 100. Furthermore, the top-bottom direction of electronic glasses 100 indicates a vertical direction of the user when the user wears electronic glasses 100. Moreover, in the following description for lenses 110 and members constituting lenses 110, "thickness direction" is coincident with the front-rear direction of electronic glasses 100.

1) Lens

Figure 3:
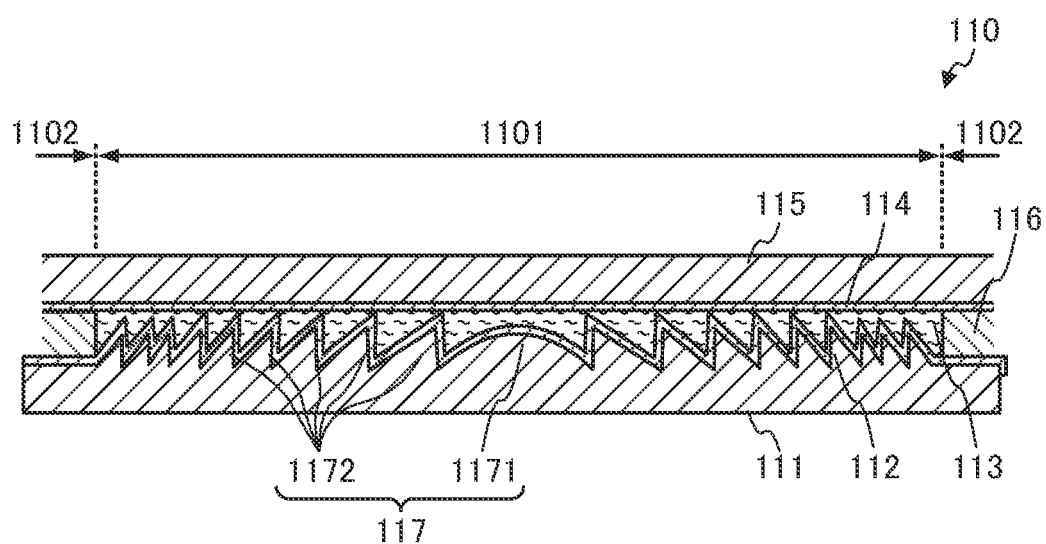
FIG. 3 is a schematic cross-sectional view illustrating an example of a configuration of a lens.
Figure 4A:
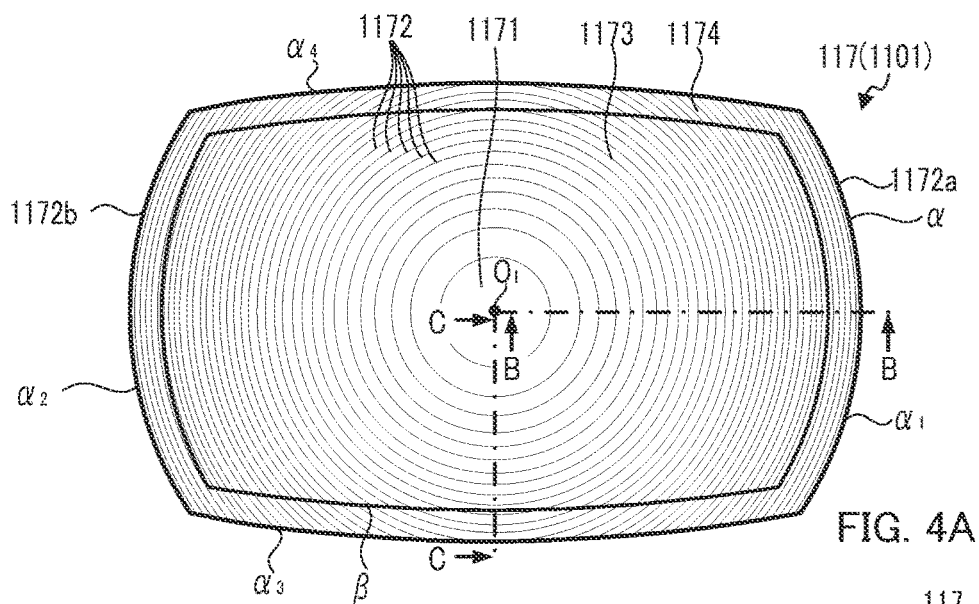
FIG. 4A is a schematic plan view illustrating an example of a shape of protruding strips in a diffraction region.
Figure 4B:
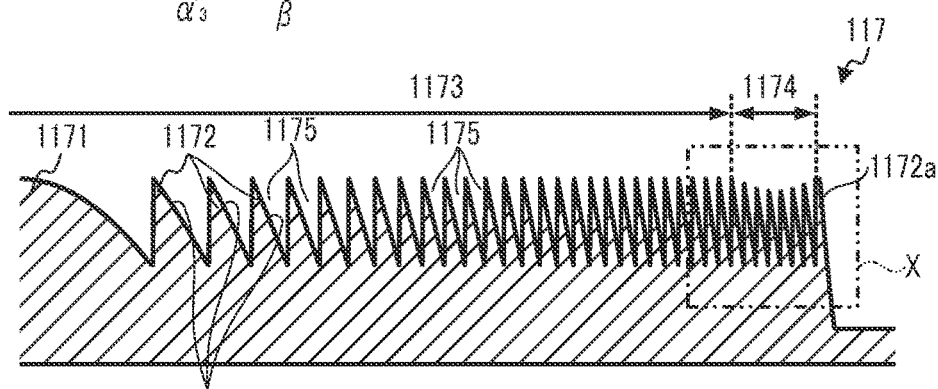
FIG. 4B is a cross-sectional view taken along line B-B in FIG. 4A.
Figure 4C:
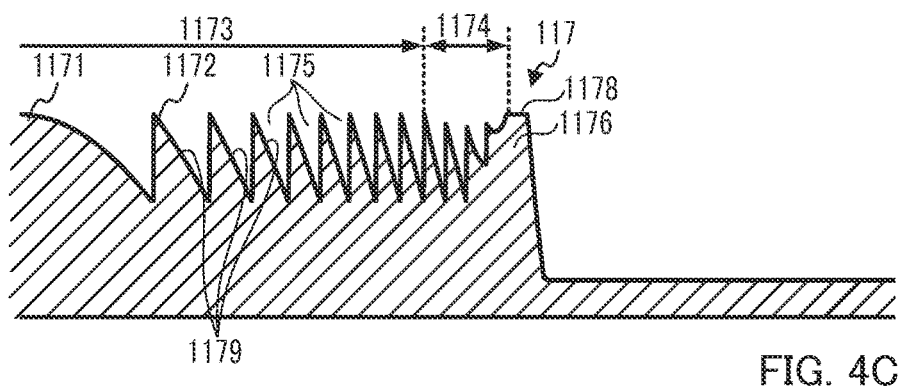
FIG. 4C is a cross-sectional view taken along line C-C in FIG. 4A.
Figure 4D:
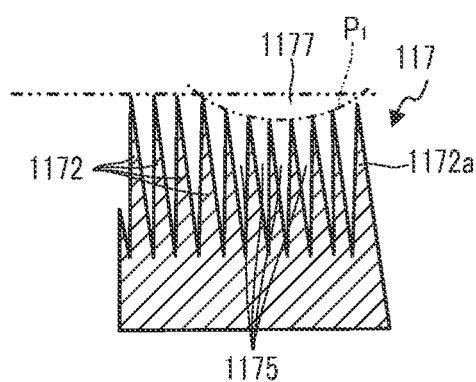
FIG. 4D is an enlarged view of an X part in FIG. 4B.

FIG. 3 is a schematic cross-sectional view illustrating an example of a configuration of each of lenses 110. FIG. 3 is a cross-sectional view taken along line A-A in FIG. 1. FIGS. 4A to 4D are schematic diagrams each illustrating an example of a shape of protruding strips 1172 in diffraction region 117. FIG. 4A is a plan view of diffraction region 117, FIG. 4B is a cross-sectional view taken along line B-B in FIG. 4A, and FIG. 4C is a cross-sectional view taken along line C-C in FIG. 4A. FIG. 4D is an enlarged view of an X part in FIG. 4B. Note that, in FIG. 3, FIG. 4B, and FIG. 4C, lens 110 (first transparent substrate 111) is illustrated while a curvature of lens 110 (first transparent substrate 111) is regarded as zero.

Note that paired lenses 110 are formed so as to be right-left symmetrical when electronic glasses 100 are viewed from the front side (in other words, in planar view from front-rear direction), and include the components same as each other. Accordingly, in the following description, right-eye lens 110 of electronic glasses 100 is described, and description of the components of left-eye lens 110 is omitted.

Lens 110 includes first region (electrically active region) 1101 in which a focal length (diopter) is switchable by a voltage, and second region 1102 that is located in a region other than first region 1101. Lens 110 may be a spherical lens or an aspherical lens. A shape of lens 110 can be appropriately adjusted based on desired optical power.

A shape, a size, and a position of first region 1101 can be appropriately designed based on the size, application, and the like of lens 110. Examples of the application of lens 110 include a bifocal lens, a progressive addition lens for near/intermediate bifocals, and a progressive addition lens for near/near bifocals. Further, as illustrated in FIG. 1, first region 1101 is located on side lower than a center part of lens 110 when lens 110 is viewed from the front side (in other words, in planar view from front-rear direction).

As illustrated in FIG. 3, first region 1101 includes first transparent substrate 111, first transparent electrode 112, liquid crystal layer 113, second transparent electrode 114, and second transparent substrate 115 in order from the rear side (lower side in FIG. 3). Second region 1102 includes first transparent substrate 111, first transparent electrode 112, bonding layer 116, second transparent electrode 114, and second transparent substrate 115 in order from the rear side. The components each have translucency to visible light.

First transparent substrate 111 is disposed on the rear side (user side) of lens 110 in electronic glasses 100. First transparent substrate 111 is curved so as to protrude toward the front side of electronic glasses 100. A curvature and a shape of first transparent substrate 111 can be appropriately adjusted based on desired optical power.

Although the detail is described below, first transparent substrate 111 includes diffraction region 117 located in a region corresponding to first region 1101. In the present embodiment, first region 1101 is coincident with diffraction region 117. Diffraction region 117 includes spherical-crown-shaped protrusion 1171 at a center part on one surface (surface on front side).

Protrusion 1171 has a circular shape in a planar view from a thickness direction (front-rear direction). In the following, a structure of diffraction region 117 in a plan-view shape from the thickness direction is described. In the present embodiment, a center position of protrusion 1171 and a center position of diffraction region 117 (first region 1101) are overlapped with each other.

Diffraction region 117 includes plurality of annular protruding strips 1172 outside protrusion 1171. Diffraction region 117 includes plurality of annular grooves 1179 (see FIG. 4B and FIG. 4C) among adjacent protruding strips 1172. In other words, diffraction region 117 includes plurality of protruding strips 1172 and plurality of grooves 1179 that are coaxially and alternately formed. Ridge lines of protruding strips 1172 are coaxially provided around the center of protrusion 1171 (in present embodiment, also center of diffraction region 117). The ridge lines of protruding strips 1172 are increased in diameter as separating from protrusion 1171 (namely, toward outside).

In contrast, plurality of protruding strips 1172 are decreased in distance between the ridge lines of adjacent protruding strips 1172 as separating from protrusion 1171 (namely, toward outside). Note that each of protruding strips 1172 may have an annular shape continuous over the entire circumference in a circumferential direction, or may have a partial annular shape. Further, the center position of protrusion 1171 and the center position of diffraction region 117 (first region 1101) may be different configuration from each other in a planar view from the thickness direction (front-rear direction) (see FIG. 11 to FIG. 13).

Note that, in the present specification, "outside" in the description for diffraction region 117 indicates a position farther from the center of diffraction region 117 along a direction orthogonal to an optical axis of light entering lens 110 from the front side of electronic glasses 100 in a state where lens 110 is used (in a state where lens 110 is assembled in electronic glasses 100 and is used). In other words, in the description for diffraction region 117, "outside" indicates a position farther from the center position of diffraction region 117 (in present embodiment, center of protrusion 1171) in a planar view (see FIG. 4A) from the thickness direction (front-rear direction). In contrast, in the description for diffraction region 117, "inside" indicates a position closer to the center position of diffraction region 117 (in present embodiment, center of protrusion 1171) in a planar view (see FIG. 4A) from the thickness direction (front-rear direction).

The shape of protrusion 1171 and protruding strips 1172 can be appropriately adjusted, based on desired optical power in diffraction of the light entered from the front side of electronic glasses 100. Although the detail is described below, the shape of protruding strips 1172 can be appropriately adjusted in terms of filling of a liquid crystal material in manufacture of lens 110 in the present embodiment. Examples of the shape of protrusion 1171 and protruding strips 1172 include a Fresnel lens shape. A part or all of protrusion 1171 and protruding strips 1172 may be formed in a Fresnel lens shape.

The material of first transparent substrate 111 is not particularly limited as long as the material has translucency. For example, as the material of first transparent substrate 111, a well-known material used as a material of a lens can be used. Examples of the material of first transparent substrate 111 include glass and a resin. Examples of the resin include polymethyl methacrylate, polycarbonate, polydiethylene glycol bis(allyl carbonate), and polystyrene.

First transparent electrode 112 and second transparent electrode 114 are paired transparent electrodes having translucency. First transparent electrode 112 and second transparent electrode 114 are disposed in at least a range (first region 1101) where first transparent electrode 112 and second transparent electrode 114 can apply a voltage to liquid crystal layer 113, and may not be disposed in second region 1102.

As illustrated in FIG. 3, first transparent electrode 112 is disposed at least between diffraction region 117 of first transparent substrate 111 and liquid crystal layer 113. In other words, first transparent electrode 112 is disposed over a region corresponding to at least diffraction region 117 on a surface (top surface in FIG. 3, and also referred to as front surface) of first transparent substrate 111 on second transparent substrate 115 side. Further in other words, first transparent electrode 112 is disposed in a region overlapped with at least diffraction region 117 in the thickness direction (top-bottom direction in FIG. 3) on the front surface of first transparent substrate 111. In the present embodiment, first transparent electrode 112 is disposed over the substantially entire front surface of first transparent substrate 111.

Second transparent electrode 114 is disposed between liquid crystal layer 113 and second transparent substrate 115. In other words, second transparent electrode 114 is disposed in a region overlapped with at least diffraction region 117 in the thickness direction, on a surface (bottom surface in FIG. 3, also referred to as rear surface) of second transparent substrate 115 on first transparent substrate 111 side. More specifically, second transparent electrode 114 is disposed so as to face first transparent electrode 112 positioned on at least diffraction region 117 in the thickness direction. In the present embodiment, second transparent electrode 114 is disposed over the substantially entire rear surface of second transparent substrate 115.

The material of first transparent electrode 112 and second transparent electrode 114 is not particularly limited as long as the material has desired translucency and desired electroconductivity. Examples of the material of first transparent electrode 112 and second transparent electrode 114 include indium tin oxide (ITO) and zinc oxide (ZnO). The material of first transparent electrode 112 and the material of second transparent electrode 114 may be the same as or different from each other.

Liquid crystal layer 113 is disposed in a space between first transparent substrate 111 and second transparent substrate 115. Liquid crystal layer 113 may be directly sandwiched between first transparent substrate 111 and second transparent substrate 115. Alternatively, liquid crystal layer 113 may be disposed between one component disposed between first transparent substrate 111 and liquid crystal layer 113 and the other component disposed between liquid crystal layer 113 and second transparent substrate 115. In the present embodiment, liquid crystal layer 113 is disposed between first transparent electrode 112 and second transparent electrode 114. Liquid crystal layer 113 has a shape corresponding to plurality of protruding strips 1172 of diffraction region 117 described below.

Liquid crystal layer 113 is configured such that a refractive index thereof is varied based on presence/absence of voltage application. Although the detail is described below, for example, the refractive index of liquid crystal layer 113 can be adjusted so as to be substantially equal to a refractive index of first transparent substrate 111 and a refractive index of second transparent substrate 115 in a state where no voltage is applied to liquid crystal layer 113. Further, the refractive index of liquid crystal layer 113 can be adjusted so as to be different from the refractive index of first transparent substrate 111 and the refractive index of second transparent substrate 115 in a state where a voltage is applied to liquid crystal layer 113.

Liquid crystal layer 113 contains a liquid crystal material. An orientation state of the liquid crystal material when the voltage is applied and an orientation state of the liquid crystal material when no voltage is applied are different from each other. The liquid crystal material can be appropriately selected based on the refractive index of first transparent substrate 111 and the refractive index of second transparent substrate 115. For example, the liquid crystal material includes cholesteric liquid crystal or nematic liquid crystal.

Second transparent substrate 115 is disposed on first transparent substrate 111 with first transparent electrode 112, liquid crystal layer 113, and second transparent electrode 114 in between. Second transparent substrate 115 is disposed on the front side of lens 110 in electronic glasses 100. Second transparent substrate 115 is also curved so as to protrude toward the front side of electronic glasses 100. A curvature of second transparent substrate 115 corresponds to the curvature of first transparent substrate 111. Examples of the material of second transparent substrate 115 are the same as the examples of the material of first transparent substrate 111.

Bonding layer 116 is disposed between first transparent substrate 111 and second transparent substrate 115 in second region 1102, and bonds first transparent substrate 111 and second transparent substrate 115 to each other. In a case where first transparent electrode 112 and second transparent electrode 114 are also disposed in second region 1102, bonding layer 116 is disposed between first transparent electrode 112 and second transparent electrode 114 disposed in second region 1102. Further, bonding layer 116 also has a function to seal the liquid crystal material constituting liquid crystal layer 113.

Bonding layer 116 is formed of a cured product of an adhesive. A material of the adhesive is not particularly limited as long as the material has desired translucency and can appropriately bond first transparent substrate 111 and second transparent substrate 115. An adhesive having a desired refractive index can be selected in order to adjust the optical power of lens 110.

Lens 110 may further include other components each having translucency as necessary. Examples of the other components include an insulating layer and an orientated film.

The insulating layer prevents conduction between first transparent electrode 112 and second transparent electrode 114 through liquid crystal layer 113. For example, the insulating layer is disposed between first transparent electrode 112 and liquid crystal layer 113 and between liquid crystal layer 113 and second transparent electrode 114. As a material of the insulating layer, a well-known material that has translucency and is used as an insulating layer can be used. Examples of the material of the insulating layer include silicon dioxide.

The orientated film controls the orientation state of the liquid crystal material in liquid crystal layer 113. For example, the orientated film is disposed between first transparent electrode 112 and liquid crystal layer 113 and between liquid crystal layer 113 and second transparent electrode 114. As a material of the orientated film, a well-known material used as the orientated film for the liquid crystal material can be used. Examples of the material of the orientated film include polyimide.

(Diffraction Region)

Next, diffraction region 117 is described. The size and the plan-view shape (shape of diffraction region 117 illustrated in FIG. 4A, and hereinafter simply referred to as plan-view shape) from the thickness direction of diffraction region 117 correspond to first region 1101. The size and the plan-view shape of diffraction region 117 can be appropriately adjusted based on an area of a human visual field. For example, diffraction region 117 is preferably formed such that a length in a width direction (right-left direction in FIG. 4A) is larger than a length in the top-down direction. Note that, in the present specification, the plan-view shape of diffraction region 117 indicates a shape when diffraction region 117 is viewed from a position on the optical axis of the light entering lens 110 on the front side of electronic glasses 100.

As illustrated in FIG. 4A, the plan-view shape of diffraction region 117 is a so-called barrel shape. In other words, in the plan-view shape, outer edge α (see FIG. 4A) of diffraction region 117 includes two pairs of opposite sides (pair of first outer edge element $\alpha_1$ and second outer edge element $\alpha_2$ and pair of third outer edge element $\alpha_3$ and fourth outer edge element $\alpha_4$ in FIG. 4A). The opposite sides of one of two pairs of opposite sides (first outer edge element $\alpha_1$ and second outer edge element $\alpha_2$ in FIG. 4A) are opposite sides extending along a short-axis direction (top-bottom direction in FIG. 4A) of diffraction region 117 and are arcs.

In the present embodiment, first outer edge element $\alpha_1$ and second outer edge element $\alpha_2$ are a part of a circle around a centroid (center) position (also center of protrusion 1171) of diffraction region 117 (first region 1101), in the plan-view shape. The opposite sides of the other of the two pairs of opposite sides (third outer edge element $\alpha_3$ and fourth outer edge element $\alpha_4$ in FIG. 4A) are opposite sides extending along a long-axis direction (right-left direction in FIG. 4A) of diffraction region 117.

Each of third outer edge element $\alpha_3$ and fourth outer edge element $\alpha_4$ connects both ends of the one pair of opposite sides. Each of third outer edge element $\alpha_3$ and fourth outer edge element $\alpha_4$ may be a straight line or a curved line. In a case where each of third outer edge element $\alpha_3$ and fourth outer edge element $\alpha_4$ is a curved line, each of third outer edge element $\alpha_3$ and fourth outer edge element $\alpha_4$ is preferably a curved line protruding to the outside of diffraction region 117 in order to enhance visibility of the user. In the present embodiment, as illustrated in FIG. 4A, each of third outer edge element $\alpha_3$ and fourth outer edge element $\alpha_4$ is a curved line protruding to the outside of diffraction region 117. Note that first outer edge element $\alpha_1$ and second outer edge element $\alpha_2$ in FIG. 4A may extend along the long-axis direction and third outer edge element $\alpha_3$ and fourth outer edge element $\alpha_4$ may extend along the short-axis direction.

In other words, first outer edge element $\alpha_1$ and second outer edge element $\alpha_2$ of outer edge $\alpha$ of diffraction region 117 are opposed to each other in a first direction (for example, right-left direction in FIG. 4A) orthogonal to the optical axis direction (direction perpendicular to paper surface of FIG. 4A). More specifically, first outer edge element $\alpha_1$ has a shape following one protruding strip 1172a that is provided on the outermost side on one side (right side in FIG. 4A) of diffraction region 117 in the first direction. In other words, a curvature radius of first outer edge element $\alpha_1$ is equal to or slightly larger than a curvature radius of protruding strip 1172a.

Note that, in the present embodiment, first outer edge element $\alpha_1$ is coincident with protruding strip 1172a. Accordingly, the curvature radius of first outer edge element $\alpha_1$ is equal to the curvature radius of protruding strip 1172a. On the other hand, second outer edge element $\alpha_2$ is coincident with one protruding strip 1172b that is provided on the outermost side on the other side (left side in FIG. 4A) of diffraction region 117 in the first direction. Accordingly, a curvature radius of second outer edge element $\alpha_2$ is equal to a curvature radius of protruding strip 1172b.

Note that first outer edge element $\alpha_1$ and second outer edge element $\alpha_2$ may be respectively positioned on the outside of protruding strip 1172a and protruding strip 1172b. In other words, protruding-strip absent part 1176 where no protruding strip is formed as illustrated in FIG. 4C may exist between protruding strip 1172a and first outer edge element $\alpha_1$ and between protruding strip 1172b and second outer edge element $\alpha_2$. In this case, the curvature radius of first outer edge element $\alpha_1$ and the curvature radius of second outer edge element $\alpha_2$ are respectively slightly larger than the curvature radius of protruding strip 1172a and the curvature radius of protruding strip 1172b.

On the other hand, third outer edge element $\alpha_3$ and fourth outer edge element $\alpha_4$ are opposed to each other in second direction (for example, top-bottom direction in FIG. 4A) orthogonal to the optical axis direction and the above-described first direction, in the plan-view shape. Such third outer edge element $\alpha_3$ and fourth outer edge element $\alpha_4$ intersect with plurality of protruding strips 1172. Accordingly, plurality of protruding strips 1172 intersecting with third outer edge element $\alpha_3$ is broken off at the position of third outer edge element $\alpha_3$. On the other hand, plurality of protruding strips 1172 intersecting with fourth outer edge element $\alpha_4$ is broken off at the position of fourth outer edge element $\alpha_4$.

In addition, third outer edge element $\alpha_3$ and fourth outer edge element $\alpha_4$ also intersect with groove spaces 1175 (see FIG. 4B and FIG. 4C) among adjacent protruding strips 1172 (namely, between grooves 1179 and second transparent substrate 115). Accordingly, groove spaces 1175 intersecting with third outer edge element $\alpha_3$ are broken off at the position of third outer edge element $\alpha_3$. On the other hand, groove spaces 1175 intersecting with fourth outer edge element $\alpha_4$ are broken off at the position of fourth outer edge element $\alpha_4$.

Groove spaces 1175 broken off at the position of third outer edge element $\alpha_3$ are open to an external space existing on the outside of third outer edge element $\alpha_3$. On the other hand, groove spaces 1175 broken off at the position of fourth outer edge element $\alpha_4$ are open to an external space existing on the outside of fourth outer edge element $\alpha_4$. In other words, broken-off groove spaces 1175 and the external space communicate with each other in a state where the liquid crystal material constituting liquid crystal layer 113 is movable.

Note that relationship between the above-described first direction and the above-described second direction is not limited to the above-described case. The above-described first direction and the above-described second direction may be rotated by a predetermined angle around the optical axis passing through center $O_1$ (see FIG. 4A) of diffraction region 117 while maintaining orthogonal relationship. Further, the above-described first direction and the above-described second direction may not be orthogonal to each other.

Figure 5:
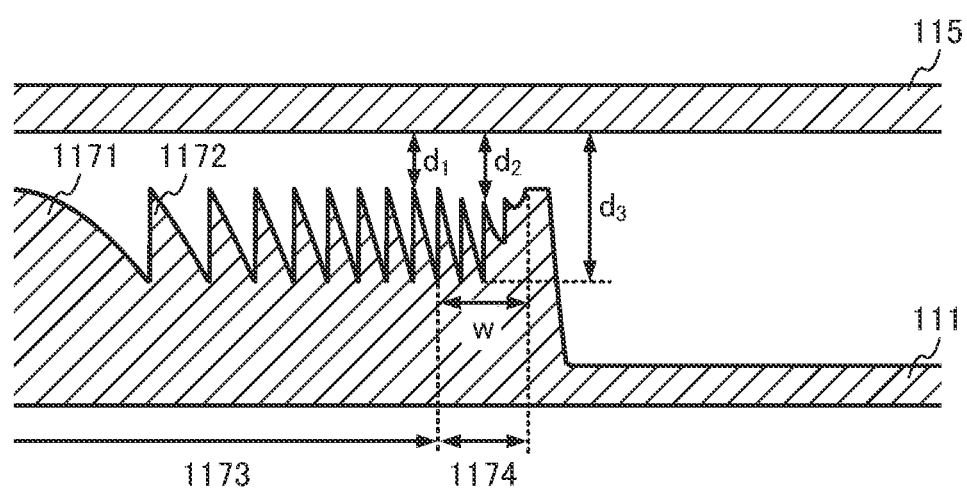
FIG. 5 is a schematic diagram to explain the shape of the protruding strips.

FIG. 5 is a schematic cross-sectional view of diffraction region 117 taken along line B-B in FIG. 4A. The shape of protruding strips 1172 is described below with reference to FIG. 5. In FIG. 5, first transparent substrate 111 and second transparent substrate 115 are illustrated while the curvature of first transparent substrate 111 and curvature of second transparent substrate 115 are regarded as zero. Note that, in FIG. 5, reference numeral $d_1$ indicates a distance between each of the ridge lines of protruding strips 1172 and second transparent substrate 115 in first diffraction region 1173. Reference numeral $d_2$ indicates a distance between each of the ridge lines of protruding strips 1172 and second transparent substrate 115 in second diffraction region 1174. Reference numeral $d_3$ indicates a distance between each of valley lines among adjacent protruding strips 1172 and second transparent substrate 115. Reference numeral w indicates a distance between an outer edge of second diffraction region 1174 and an inner edge of second diffraction region 1174 (width of second diffraction region 1174).

As illustrated in FIGS. 4B and 4C and FIG. 5, diffraction region 117 includes first diffraction region 1173 and second diffraction region 1174. First diffraction region 1173 is located at a position including the center part of diffraction region 117 in a planar view from the thickness direction.

In the present specification, "first diffraction region 1173" indicates a region where protruding strips 1172 are formed such that liquid crystal layer 113 (liquid crystal material) is not substantially disposed between the ridge lines of protruding strips 1172 and second transparent substrate 115. In other words, first diffraction region 1173 indicates a region where protruding strips 1172 are formed such that the components (in present embodiment, first transparent electrode 112 and second transparent electrode 114) disposed on both sides of liquid crystal layer 113 come into contact with or come close to each other between the ridge lines of protruding strips 1172 and second transparent substrate 115. In a state where "the components come close to each other", it is sufficient for the components to come close to each other to a degree enough to prevent the liquid crystal material constituting liquid crystal layer 113 from sufficiently moving between the ridge lines of protruding strips 1172 and second transparent substrate 115 over the ridge lines. In a case where the components each have insulation property, the components may be in contact with each other.

Further in other words, first diffraction region 1173 is a region where communication space 1177 (see FIG. 4D) which communicates between groove spaces 1175 located on both sides of each of protruding strips 1172 so as to allow liquid crystal layer 113 (liquid crystal material) to move is not provided between the ridge lines of protruding strips 1172 and second transparent substrate 115. More specifically, in the present embodiment, first diffraction region 1173 is a region inside solid line β of diffraction region 117 in FIG. 4A in a planar view (in a state illustrated in FIG. 4A) from the thickness direction. Solid line β is an inner end edge of second diffraction region 1174 described below.

On the other hand, "second diffraction region 1174" indicates a region where protruding strips 1172 are formed such that liquid crystal layer 113 (liquid crystal material) is disposed between the ridge lines of protruding strips 1172 and second transparent substrate 115. In other words, second diffraction region 1174 indicates a region where protruding strips 1172 are formed such that the components disposed on both sides of liquid crystal layer 113 are separated from each other between the ridge lines of protruding strips 1172 and second transparent substrate 115. Further in other words, second diffraction region 1174 is a region where communication space 1177 (see FIG. 4D) which communicates between groove spaces 1175 located on both sides of each of protruding strips 1172 so as to allow liquid crystal layer 113 (liquid crystal material) to move is provided between the ridge lines of protruding strips 1172 and second transparent substrate 115.

Second diffraction region 1174 is located at least a part on the outside of first diffraction region 1173 in diffraction region 117. In the present embodiment, second diffraction region 1174 is located on an outer edge part of diffraction region 117 (predetermined range including outer edge α of diffraction region 117). More specifically, in the present embodiment, second diffraction region 1174 is a region inside outer edge α and outside solid line β in FIG. 4A of diffraction region 117 in the plan-view shape (in a state illustrated in FIG. 4A).

Second diffraction region 1174 may be continuously located over the entire circumference or may not be located over the entire circumference on the outside of first diffraction region 1173 (in present embodiment, outer edge part of diffraction region 117). The example in which second diffraction region 1174 is continuously provided over the entire circumference on the outside of first diffraction region 1173 in diffraction region 117 corresponds to the present embodiment. In contrast, the example in which second diffraction region 1174 is provided in a part of the outside of first diffraction region 1173 in diffraction region 117 corresponds to Embodiments 2 to 5 described below.

Although the detail is described below, second diffraction region 1174 is preferably located over the entire circumference on the outer edge part of diffraction region 117 in order to evenly provide the liquid crystal material on the outer edge part of diffraction region 117. The size of second diffraction region 1174 can be appropriately adjusted based on the size of lens 110 within a range in which the effects of the present embodiment are achievable. For example, distance w is set to 0.1 mm to 2 mm.

Note that, as illustrated in FIG. 4C and FIG. 5, for example, protruding-strip absent part 1176 where no protruding strip 1172 is formed may be provided on the outside of second diffraction region 1174 in diffraction region 117. Protruding-strip absent part 1176 contributes to prevention of flowing-out of the liquid crystal material (namely, exerts sealing function). Protruding-strip absent part 1176 may be provided on the outside of second diffraction region 1174 so as to surround the entire circumference of second diffraction region. Protruding-strip absent part 1176 may include planar part 1178 as illustrated in FIG. 4C on a front end. Such a configuration is more effective to prevent the liquid crystal material from flowing out. Further, as illustrated in FIG. 4B, the ridge line of protruding strip 1172a on the outermost side in second diffraction region 1174 may be located at a position (upper side in FIG. 4B) close to second transparent substrate 115 as compared with the positions of the ridge lines of the other protruding strips 1172 constituting second diffraction region 1174. Such a configuration also contributes to prevention of flowing-out of the liquid crystal material.

Although the detail is described below, the shape of protruding strips 1172 in second diffraction region 1174 is not particularly limited as long as the liquid crystal material can appropriately move over the ridge lines through a gap (communication space 1177 in FIG. 4D) between the ridge lines of protruding strips 1172 and second transparent substrate 115, in manufacture of lens 110. From such perspectives, protruding strips 1172 are formed such that distance $d_2$ is larger than distance $d_1$.

To appropriately dispose the liquid crystal material to the outer edge part of diffraction region 117, at least a part of a virtual surface (see alternate long and two short dashes line $P_1$ in FIG. 4D) formed by connecting the ridge lines of protruding strips 1172 in second diffraction region 1174 preferably has a groove shape. The shape of at least a part of the virtual surface preferably has the groove shape extending along an outer periphery of lens 110. In addition, of the outer periphery of lens 110, the shape of at least a part of the virtual surface may have the groove shape extending along paired opposite sides crossing the horizontal direction. The "horizontal direction" used herein indicates the horizontal direction in the right-left direction of electronic glasses 100 and in a direction orthogonal to the optical axis of the light entering lens 110, in the state where lens 110 is used (in a state where lens 110 is assembled in electronic glasses 100 and is used).

From the above-described perspectives, the virtual surface formed by connecting the ridge lines of adjacent protruding strips 1172 in second diffraction region 1174 at the shortest distance preferably has the groove shape (see alternate long and two short dashes line $P_1$ in FIG. 4D) recessed with respect to second transparent substrate 115. Note that alternate long and two short dashes line $P_1$ in FIG. 4D indicates a cross-sectional shape of the above-described virtual surface in a case where second diffraction region 1174 is cut on a surface that passes through a normal of protruding strips 1172 and is parallel to the optical axis direction, in a planar view (in a state illustrated in FIG. 4A) from the thickness direction.

In the present embodiment, a middle part of virtual surface $P_1$ is farthest from second transparent substrate 115. Further, virtual surface $P_1$ comes close to second transparent substrate 115 as it goes from the middle part to the inner end edge (namely, toward center of diffraction region 117). In addition, virtual surface $P_1$ comes close to second transparent substrate 115 as it goes from the middle part to the outer end edge (namely, as separating from center of diffraction region 117).

Moreover, to appropriately dispose the liquid crystal material to the outer edge part of diffraction region 117, distance $d_1$ between the ridge line of protruding strip 1172 located on the outer edge of first diffraction region 1173 and second transparent substrate 115 and maximum value ($d_{2max}$) of distance $d_2$ between each of protruding strips 1172 and second transparent substrate 115 in second diffraction region 1174 are preferably different by 0.1 μm to 2 μm.

To suppress drastic change of a focal length at a boundary between first region 1101 and second region 1102 to improve visibility of the user, at least a part of plurality of protruding strips 1172 formed on the outer edge part of diffraction region 117 is preferably provided such that distance $d_3$ between each of the valley lines among adjacent protruding strips 1172 and second transparent substrate 115 is gradually reduced toward the outer edge α (see FIG. 4A) of diffraction region 117.

In the following, a region where distance $d_3$ is gradually reduced toward the outer edge of diffraction region 117 is also referred to as a blend zone. The blend zone is located in at least a part of second diffraction region 1174. The above-described blend zone may be located over both of first diffraction region 1173 and second diffraction region 1174. In addition, the above-described blend zone may be located over the entire circumference or may not be located over the entire circumference on the outer edge part of diffraction region 117.

In terms of visibility of the user, the above-described blend zone is preferably formed on an upper end part (also referred to as one end part in first direction) and a lower end part (also referred to as other end part in first direction) of diffraction region 117. In the present embodiment, the above-described blend zone is formed only on the upper end part and the lower end part of diffraction region 117 and on the outer edge part of second diffraction region 1174 (see and compare FIG. 4B and FIG. 4C).

(Method of Manufacturing Lens)

Lens 110 can be manufactured by, for example, the following manufacturing method. First, first transparent substrate 111 and second transparent substrate 115 are prepared. First transparent substrate 111 and second transparent substrate 115 can be manufactured by, for example, injection molding. Next, first transparent electrode 112 is formed on first transparent substrate 111, and second transparent electrode 114 is formed on second transparent substrate 115.

Examples of a method of forming first transparent electrode 112 on first transparent substrate 111 and examples of a method of forming second transparent electrode 114 on second transparent substrate 115 each include a vacuum deposition method and sputtering. Next, the liquid crystal material is provided on diffraction region 117 of first transparent substrate 111 provided with first transparent electrode 112 as well as the adhesive is provided to a part other than diffraction region 117 of first transparent substrate 111. Second transparent substrate 115 provided with second transparent electrode 114 is disposed on first transparent substrate 111 while the liquid crystal material and the adhesive are disposed on first transparent substrate 111. Finally, the adhesive is cured. As a result, lens 110 is manufactured.

Figure 6A:
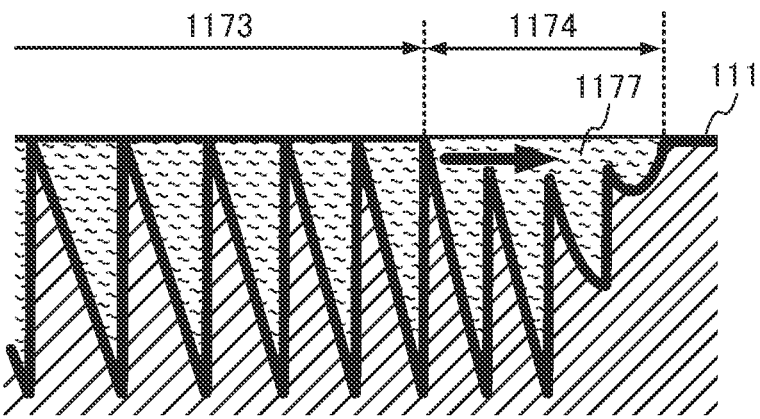
FIG. 6A is a schematic cross-sectional view to explain a role of a second diffraction region.
Figure 6B:
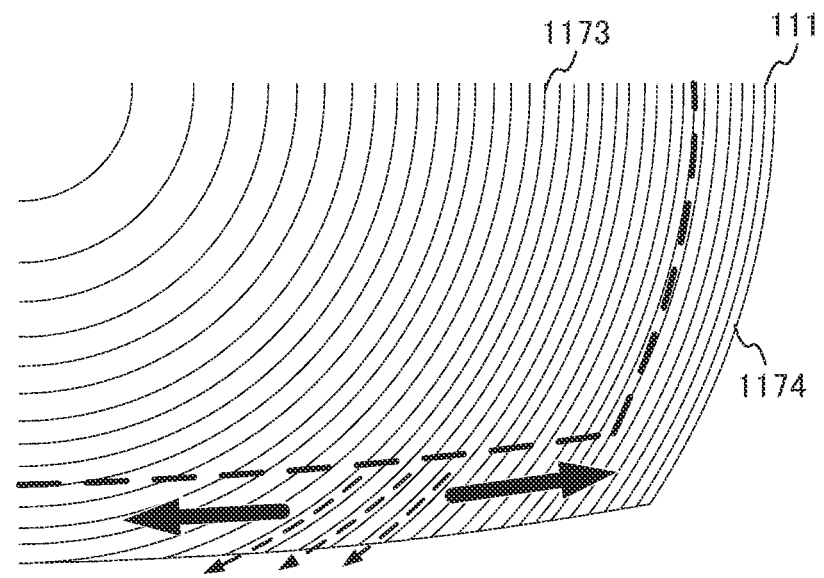
FIG. 6B is a schematic plan view to explain the role of the second diffraction region.

FIGS. 6A and 6B are schematic diagrams to explain a role of second diffraction region 1174. In FIGS. 6A and 6B, illustration of the configuration other than first transparent substrate 111 is omitted.

A case where diffraction region 117 does not include second diffraction region 1174 (only include first diffraction region 1173) is considered. In this case, since the spaces among adjacent protruding strips 1172 do not communicate with one another through the gap between the ridge lines of protruding strips 1172 and second transparent substrate 115, the liquid crystal material cannot move among the spaces over the ridge lines. Accordingly, the outer edge part (for example, upper end part, lower end part, left end part, and right end part of diffraction region 117 in FIG. 4A) of diffraction region 117 where a supply amount of the liquid crystal material easily becomes insufficient may not be appropriately filled with the liquid crystal material.

In the present embodiment, however, diffraction region 117 includes second diffraction region 1174 and protruding strips 1172 are configured such that distance $d_2$ is larger than distance $d_1$ (see FIG. 5). As a result, the gap (communication space 1177) through which the liquid crystal material can move over the ridge lines is formed between the ridge lines of protruding strips 1172 and second transparent substrate 115. Accordingly, when first transparent substrate 111 and second transparent substrate 115 are superimposed on each other, the liquid crystal material can move among the adjacent spaces through the above-described gap (see thick arrow in FIG. 6A). As a result, the liquid crystal material can be appropriately disposed even on the outer edge part of diffraction region 117.

Now, the case where diffraction region 117 does not include second diffraction region 1174 (only includes first diffraction region 1173) is considered again. At the outer edge part (upper end part and lower end part in FIG. 4A) of diffraction region 117, the spaces (groove spaces 1175) among the adjacent protruding strips 1172 communicate with the space (space between first transparent substrate 111 and second transparent substrate 115) outside diffraction region 117. Accordingly, in the case where diffraction region 117 does not include second diffraction region 1174, the liquid crystal material can flow only in the direction along groove spaces 1175 and may flow out to the outside of diffraction region 117 (see thin dashed arrow in FIG. 6B).

In the present embodiment, however, groove spaces 1175 in second diffraction region 1174 communicate with one another through the above-described gap (communication space 1177). Accordingly, the liquid crystal material can move among adjacent groove spaces 1175 through communication space 1177 (see thick arrow in FIG. 6B). In other words, a flow path of the liquid crystal material is separately formed, and the liquid crystal material is prevented from flowing into the outside of diffraction region 117. As a result, the liquid crystal material can be appropriately disposed even on the outer edge part of diffraction region 117.

As described above, in the present embodiment, it is possible to appropriately provide the liquid crystal material and to appropriately dispose liquid crystal layer 113 even on the outer edge part of diffraction region 117. To appropriately dispose liquid crystal layer 113 over the entire circumference of diffraction region 117, second diffraction region 1174 is preferably located over the entire circumference on the outer edge part of diffraction region 117.

2) Front

As illustrated in FIG. 1, front 130 holds paired lenses 110. Front 130 includes paired rims 131 supporting respective paired lenses 110, and bridge 132 that connects paired rims 131 in the width direction. The shape of each of rims 131 corresponds to the shape of each of lenses 110. Bridge 132 includes paired nose pads 133 that can come into contact with a nose of the user. As illustrated in FIG. 1, wiring 10 that electrically connects first transparent electrode 112 of each of lenses 110 and control section 150 described below, and electrically connects second transparent electrode 114 of each of lenses 110 and control section 150 is disposed inside front 130.

A material of front 130 is not particularly limited. As the material of front 130, a well-known material used as a material of a front of glasses can be used. Examples of the material of front 130 include polyamide, acetate, carbon, celluloid, polyetherimide, and urethane.

3) Temple

Paired temples 140 are formed so as to be substantially right-left symmetrical in electronic glasses 100, and includes the components same as each other. Accordingly, in the following description, right-side (one side in width direction) temple 140 is described, and the components of left-side (other side in width direction) temple 140 are denoted by the same reference numerals, and description of the components is omitted.

A front end part of temple 140 is connected to front 130. For example, temple 140 rotatably engages with corresponding rim 131 of front 130.

As illustrated in FIG. 1, temple 140 includes housing 141 and detection section 142.

Housing 141 configures an outer shape of temple 140. Housing 141 contains detection section 142 and control section 150. Housing 141 extends along one direction. Housing 141 includes a protruding strip on a left-side surface (outside surface of electronic glasses 100). A position on the left-side surface of housing 141 corresponding to detection section 142 has a planar shape. Accordingly, the user can easily recognize the position where detection section 142 is located. Further, a surface shape on a right-side surface of housing 141 (inside surface of electronic glasses 100) is a planar shape.

A material of housing 141 is not particularly limited. As the material of housing 141, a well-known material used as a material of a temple of glasses can be used. Examples of the material of housing 141 are same as the examples of the material of front 130.

Detection section 142 includes, for example, an electrostatic capacitance detection pad. As the detection pad, a well-known detection pad used as a touch sensor can be used. Detection section 142 detects change of an electrostatic capacitance caused by contact when an object (finger of user or the like) comes into contact with the position of housing 141 corresponding to detection section 142.

4) Control Section

Control section 150 is electrically connected to the detection pad of detection section 142 and the electrodes (first transparent electrode 112 and second transparent electrode 114) of lenses 110 through wiring 10. When detection section 142 detects contact of the object, control section 150 applies a voltage to paired lenses 110 or stops application of the voltage to paired lenses 110, thereby switching the focal length (diopter) of first region 1101 (see FIG. 2). Control section 150 includes a control circuit that controls, for example, driving of the detection pad, detection of change of the electrostatic capacitance in the detection pad, and application of the voltage between first transparent electrode 112 and second transparent electrode 114 (in present embodiment, liquid crystal layer 113) of each of lenses 110. For example, control section 150 is mounted on detection section 142 while being connected to the detection pad so as to receive a detection result about change of the electrostatic capacitance in the detection pad.

5) Power Supply

Power supply 160 supplies power to detection section 142 and control section 150 (see FIG. 2). In the present embodiment, power supply 160 is a chargeable battery pack that is detachably held by the other end part (rear end part) of each of temples 140. Examples of power supply 160 include a nickel-hydrogen rechargeable battery.

[Operation of Electronic Glasses]

Subsequently, an example of operation of electronic glasses 100 is described. First, a state (off state) where a voltage is not applied to liquid crystal layer 113 of electronic glasses 100 is described. In the off state, the refractive index of liquid crystal layer 113 and the refractive index of each of first transparent substrate 111 and second transparent substrate 115 are substantially equal to each other in first region 1101 of each of lenses 110. Therefore, the lens effect derived from liquid crystal layer 113 does not occur. Accordingly, in each of lenses 110, the focal length (diopter) of first region 1101 and the focal length (diopter) of second region 1102 become substantially equal to each other.

When the position of housing 141 corresponding to detection section 142 is contacted by an object (for example, finger of user) as a conductor, change of the electrostatic capacitance caused by the contact is detected by the detection pad of detection section 142. The detection result of the contact is transmitted to control section 150. When the contact of the object is detected in the off state, control section 150 applies a voltage to liquid crystal layer 113 of each of lenses 110.

As a result, orientation of the liquid crystal material in liquid crystal layer 113 is changed and the refractive index of liquid crystal layer 113 is changed (on state). In the on state, the refractive index of liquid crystal layer 113 and the refractive index of each of first transparent substrate 111 and second transparent substrate 115 are different from each other. Therefore, the lens effect derived from liquid crystal layer 113 occurs in first region 1101. This makes it possible to change the focal length (diopter) of first region 1101.

In the on state, when the position of housing 141 corresponding to detection section 142 is contacted by an object, the detection result of the contact is transmitted to control section 150 in a manner similar to the above. When the contact of the object is detected in the on state, control section 150 stops application of the voltage to liquid crystal layer 113. As a result, orientation of the liquid crystal material in liquid crystal layer 113 is returned to the state before application of the voltage, and the refractive index of liquid crystal layer 113 is also returned to the state before application of the voltage (off state).

As described above, in electronic glasses 100 according to the present embodiment, it is possible to detect the contact of an object and to switch the focal length of first region 1101 of each of lenses 110.

Figure 7:
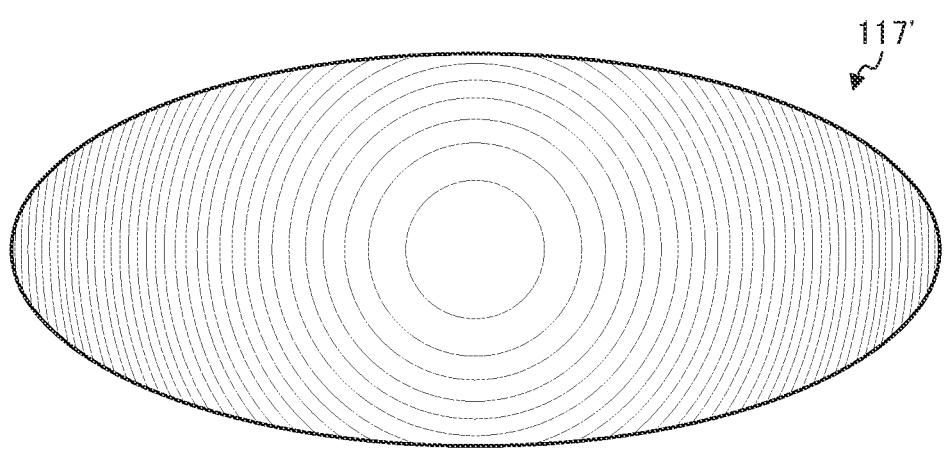
FIG. 7 is a diagram illustrating another example of a plan-view shape of a diffraction region.

Although the case where the plan-view shape of diffraction region 117 is a barrel shape has been described in the present embodiment, the plan-view shape of diffraction region 117 is not particularly limited. FIG. 7 is a diagram illustrating another example of a plan-view shape of diffraction region 117'. As illustrated in FIG. 7, the plan-view shape of diffraction region 117' may be an elliptical shape.

[Configuration of Lens Blank]

Figure 8:
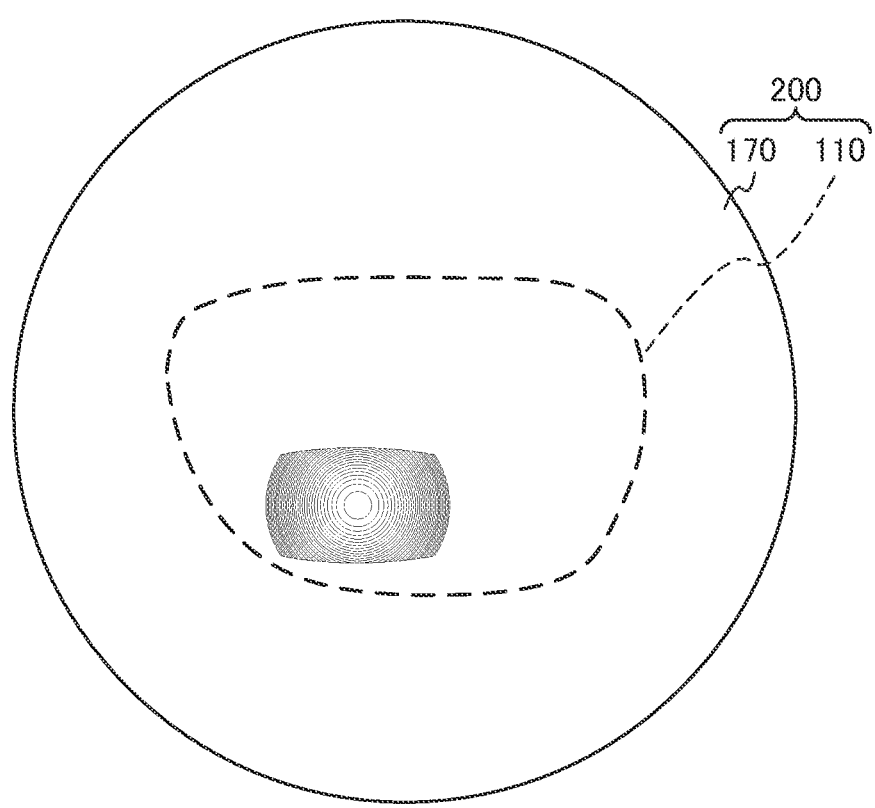
FIG. 8 is a diagram illustrating an example of a configuration of a lens blank.

Further, each of lenses 110 may be formed integrally with blank portion 170. FIG. 8 is a diagram illustrating an example of a configuration of lens blank 200. FIG. 8 is a plan view of lens blank 200. Lens blank 200 includes blank portion 170, and lens 110 formed integrally with blank portion 170.

Blank portion 170 is located outside lens 110 so as to surround lens 110. A configuration of blank portion 170 is the same as, for example, the configuration of second region 1102 in lens 110. Lens blank 200 is processed to a desired shape and a desired size, to obtain lens 110 having a desired outer shape and a desired size. In the present embodiment, lens 110 can be obtained by cutting out blank portion 170 along a dashed line illustrated in FIG. 8. An outer shape of blank portion 170 is not particularly limited, and is, for example, a circular shape.

(Effects)

Diffraction region 117 in each of lenses 110 of electronic glasses 100 according to the present embodiment includes first diffraction region 1173 and second diffraction region 1174. Therefore, in manufacture of lenses 110, it is possible to appropriately and easily dispose the liquid crystal material even on the outer edge part of diffraction region 117. As a result, liquid crystal layer 113 can be appropriately and easily disposed even on the outer edge part of diffraction region 117.

Embodiment 2

Embodiment 2 according to the present invention is described with reference to FIG. 9. A lens according to the present embodiment is different from Embodiment 1 described above in position of second diffraction region 1174$a$ of diffraction region 117$a$. More specifically, in the present embodiment, second diffraction region 1174$a$ is provided in only a part of the outside of first diffraction region 1173$a$ in diffraction region 117$a$.

The other configuration of diffraction region 117$a$ is similar to the configuration in Embodiment 1 described above. Accordingly, the lens according to the present embodiment is described below while focusing on the structure of parts different from Embodiment 1 described above. In the present embodiment, description in Embodiment 1 described above is appropriately applicable to the structure similar to the structure according to Embodiment 1.

Also in the present embodiment, the plan-view shape of diffraction region 117$a$ is a so-called barrel shape. The structure of diffraction region 117$a$ in the plan-view shape is described below. Outer edge α of diffraction region 117 includes first outer edge element $α_1$ and second outer edge element $α_2$ that are opposed to each other in the first direction (for example, right-left direction in FIG. 9) orthogonal to the optical axis direction (direction perpendicular to paper surface of FIG. 9), and third outer edge element $\alpha_3$ and fourth outer edge element $\alpha_4$ that are opposed to each other in the second direction (for example, top-bottom direction in FIG. 9) orthogonal to the optical axis direction and the first direction. Note that, in the present embodiment, the above-described first direction is coincident with a short-axis direction of diffraction region 117a in the plan-view shape, and the above-described second direction is coincident with a long-axis direction of diffraction region 117a in the plan-view shape.

More specifically, first outer edge element $\alpha_1$ has a shape following protruding strip 1172a that is provided on the outermost side on one side (right side in FIG. 9) of diffraction region 117a in the first direction. In other words, the curvature radius of first outer edge element $\alpha_1$ is equal to or slightly larger than the curvature radius of protruding strip 1172a.

In contrast, third outer edge element $\alpha_3$ is a curved line protruding to the outside, and connects one end (upper end in FIG. 9) of first outer edge element $\alpha_1$ and one end (upper end in FIG. 9) of second outer edge element $\alpha_2$. Fourth outer edge element $\alpha_4$ connects the other end (lower end in FIG. 9) of first outer edge element $\alpha_1$ and the other end (upper end in FIG. 9) of second outer edge element $\alpha_2$. Third outer edge element $\alpha_3$ and fourth outer edge element $\alpha_4$ may be curved lines protruding to the inside or straight lines.

Third outer edge element $\alpha_3$ and fourth outer edge element $\alpha_4$ intersect with plurality of protruding strips 1172. Plurality of protruding strips 1172 intersecting with third outer edge element $\alpha_3$ is broken off at the position of third outer edge element $\alpha_3$. On the other hand, plurality of protruding strips 1172 intersecting with fourth outer edge element $\alpha_4$ is broken off at the position of fourth outer edge element $\alpha_4$.

In addition, third outer edge element $\alpha_3$ and fourth outer edge element $\alpha_4$ also intersect with groove spaces 1175 (see FIG. 4B and FIG. 4C) among adjacent protruding strips 1172. Groove spaces 1175 intersecting with third outer edge element $\alpha_3$ are broken off at the position of third outer edge element $\alpha_3$. On the other hand, groove spaces 1175 intersecting with fourth outer edge element $\alpha_4$ are broken off at the position of fourth outer edge element $\alpha_4$.

Groove spaces 1175 broken off at the position of third outer edge element $\alpha_3$ are open to an external space existing on the outside of third outer edge element $\alpha_3$. On the other hand, groove spaces 1175 broken off at the position of fourth outer edge element $\alpha_4$ are open to an external space existing on the outside of fourth outer edge element $\alpha_4$. In other words, broken-off groove spaces 1175 and the external space communicate with each other in a state where the liquid crystal material constituting liquid crystal layer 113 is movable.

In the present embodiment, second diffraction region 1174a is provided at a part on the outer peripheral edge of diffraction region 117a along third outer edge element $\alpha_3$ and fourth outer edge element $\alpha_4$.

Figure 9:
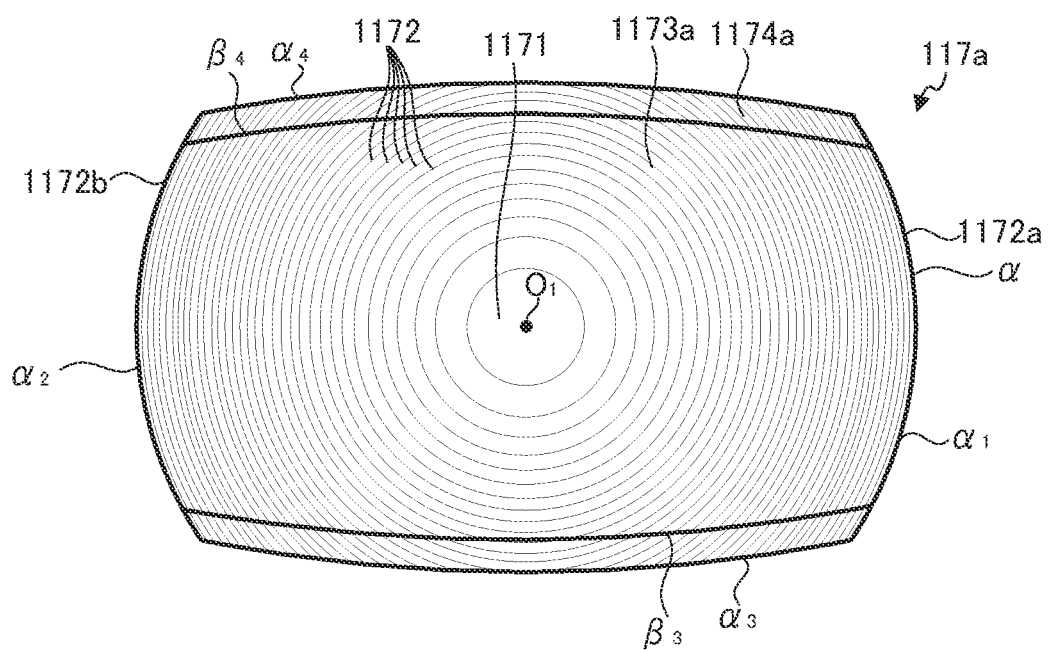
FIG. 9 is a schematic diagram to explain a configuration of a diffraction region of a lens according to Embodiment 2.

More specifically, second diffraction region 1174a located along third outer edge element $\alpha_3$ is provided inside third outer edge element $\alpha_3$ and outside solid line $\beta_3$ in FIG. 9 in diffraction region 117a. On the other hand, second diffraction region 1174a located along fourth outer edge element $\alpha_4$ is provided inside fourth outer edge element $\alpha_4$ and outside solid line $\beta_4$ in FIG. 9 in diffraction region 117a.

Also in the present embodiment, in second diffraction region 1174a, adjacent groove spaces 1175 (see FIG. 4D) communicate with one another through communication space 1177 that exists between the ridge lines of protruding strips 1172 and second transparent substrate 115.

Accordingly, in second diffraction region 1174a, liquid crystal layer 113 (liquid crystal material) can move among adjacent groove spaces 1175 through communication space 1177. In other words, in second diffraction region 1174a, liquid crystal layer 113 (liquid crystal material) in groove spaces 1175 can move not only in a direction along groove spaces 1175 but also in direction toward adjacent groove spaces 1175.

As a result, liquid crystal layer 113 (liquid crystal material) disposed in the part along third outer edge element $\alpha_3$ and fourth outer edge element $\alpha_4$ hardly flows out to the external space outside third outer edge element $\alpha_3$ and fourth outer edge element $\alpha_4$. Note that, in the part along first outer edge element $\alpha_1$ and second outer edge element $\alpha_2$, protruding strips 1172a and 1172b on the outermost side are respectively continuous over the entire length of first outer edge element $\alpha_1$ and second outer edge element $\alpha_2$. Since such protruding strips 1172a and 1172b serve as weirs, liquid crystal layer 113 (liquid crystal material) in the part along first outer edge element $\alpha_1$ and second outer edge element $\alpha_2$ in diffraction region 117 hardly flows out to the external space. The other configurations, action, and effects are similar to those in Embodiment 1 described above.

Embodiment 3

Figure 10:
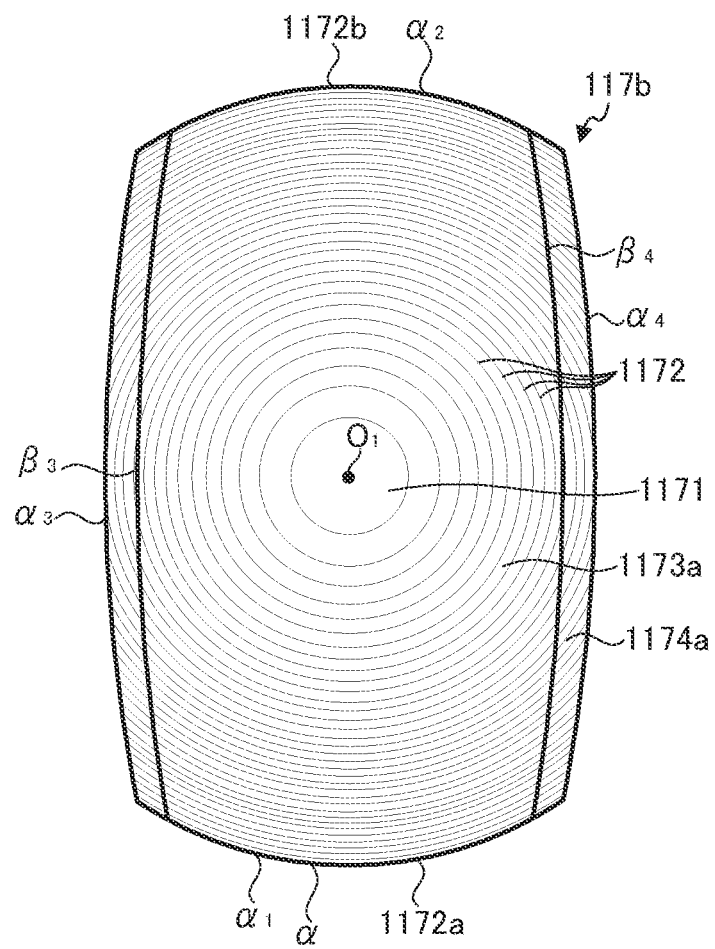
FIG. 10 is a schematic diagram to explain a configuration of a diffraction region of a lens according to Embodiment 3.

Embodiment 3 according to the present invention is described with reference to FIG. 10. A lens according to the present embodiment is different from the lens according to Embodiment 2 described above in direction of diffraction region 117b in the lens. More specifically, diffraction region 117b according to the present embodiment has a configuration obtained by rotating diffraction region 117a according to Embodiment 2 around the optical axis (clockwise direction in FIG. 10) passing through center $O_1$ of diffraction region 117a, by 90 degrees. The other configuration of diffraction region 117b is similar to the configuration according to Embodiment 2 described above. Therefore, detailed description is omitted.

Embodiment 4

Figure 11:
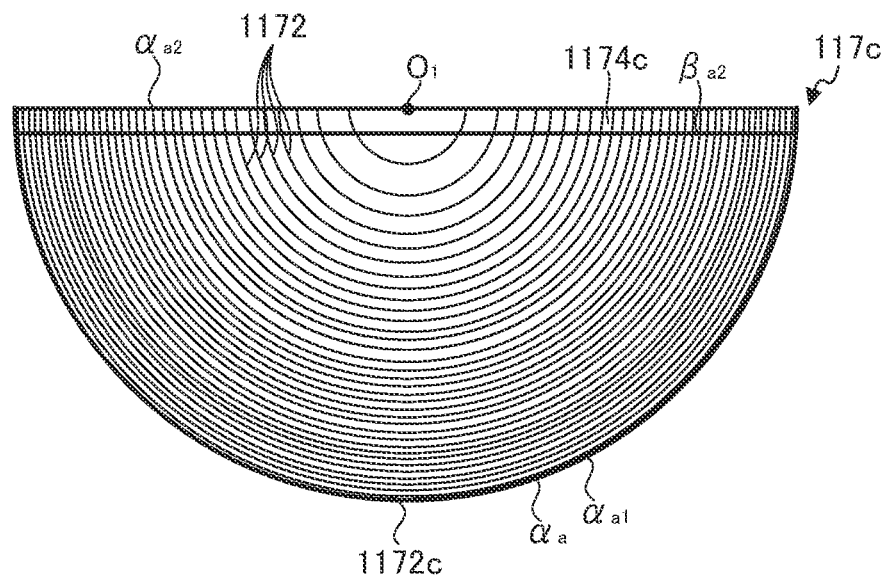
FIG. 11 is a schematic diagram to explain a configuration of a diffraction region of a lens according to Embodiment 4.

Embodiment 4 according to the present invention is described with reference to FIG. 11. A lens according to the present embodiment is different from the lens according to Embodiment 1 described above in configuration of diffraction region 117c. Diffraction region 117c according to the present embodiment is described below while focusing on a part different from Embodiment 1.

A plan-view shape of diffraction region 117c according to the present embodiment is a semicircular shape. The structure of diffraction region 117c in the plan-view shape is described below. More specifically, outer edge $\alpha_a$ of diffraction region 117c includes first outer edge element $\alpha_{a1}$ having a semi-arcuate shape and second outer edge element $\alpha_{a2}$ having a linear shape. Second outer edge element $\alpha_{a2}$ connects both ends of first outer edge element $\alpha_{a1}$.

Plurality of protruding strips 1172 of diffraction region 117c is coaxially formed around center $O_1$ of protrusion 1171. Plurality of protruding strips 1172 has a semi-arcuate shape. Inner diameters of plurality of protruding strips 1172 are gradually increased as separating from center $O_1$ of protrusion 1171. In addition, distances among adjacent protruding strips 1172 are gradually decreased as separating from center $O_1$ of protrusion 1171. In the present embodiment, center $O_1$ of protrusion 1171 and a center (not illustrated) of diffraction region 117c are different from each other.

First outer edge element $\alpha_{a1}$ is a part of a circle around center $O_1$ of protrusion 1171. First outer edge element $\alpha_{a1}$ has a shape following protruding strip 1172c that is farthest from center $O_1$ of protrusion 1171, among plurality of protruding strips 1172. In other words, a curvature radius of first outer edge element $\alpha_{a1}$ is equal to or slightly larger than a curvature radius of protruding strip 1172c.

On the other hand, in the present embodiment, second outer edge element $\alpha_{a2}$ has the linear shape that connects the both ends of first outer edge element $\alpha_{a1}$. Such second outer edge element $\alpha_{a2}$ intersects with (in present embodiment, is orthogonal to) plurality of protruding strips 1172. Accordingly, plurality of protruding strips 1172 intersecting with second outer edge element $\alpha_{a2}$ is broken off at the position of second outer edge element $\alpha_{a2}$.

In addition, second outer edge element $\alpha_{a2}$ also intersects with (in present embodiment, is orthogonal to) groove spaces 1175 (see FIG. 4B and FIG. 4C) among adjacent protruding strips 1172. Accordingly, groove spaces 1175 intersecting second outer edge element $\alpha_{a2}$ are broken off at the position of second outer edge element $\alpha_{a2}$.

Groove spaces 1175 broken off at the position of second outer edge element $\alpha_{a2}$ are open to an external space existing on the outside of second outer edge element $\alpha_{a2}$. In other words, broken-off groove spaces 1175 and the external space communicate with each other in a state where the liquid crystal material constituting liquid crystal layer 113 is movable.

In the present embodiment, second diffraction region 1174c is provided in at least a part on an outer peripheral edge of diffraction region 117c along second outer edge element $\alpha_{a2}$. In the present embodiment, second diffraction region 1174c is provided along the entire length of second outer edge element $\alpha_{a2}$. More specifically, second diffraction region 1174c is provided inside second outer edge element $\alpha_{a2}$ (side close to center of diffraction region 117) and outside solid line $\beta_{a2}$ (side far from center of diffraction region 117) in FIG. 11 in diffraction region 117c.

Note that second diffraction region 1174c may be provided along only a part of second outer edge element $\alpha_{a2}$. The other configurations, action, and effects are similar to those in Embodiment 2 described above.

Embodiment 5

Figure 12:
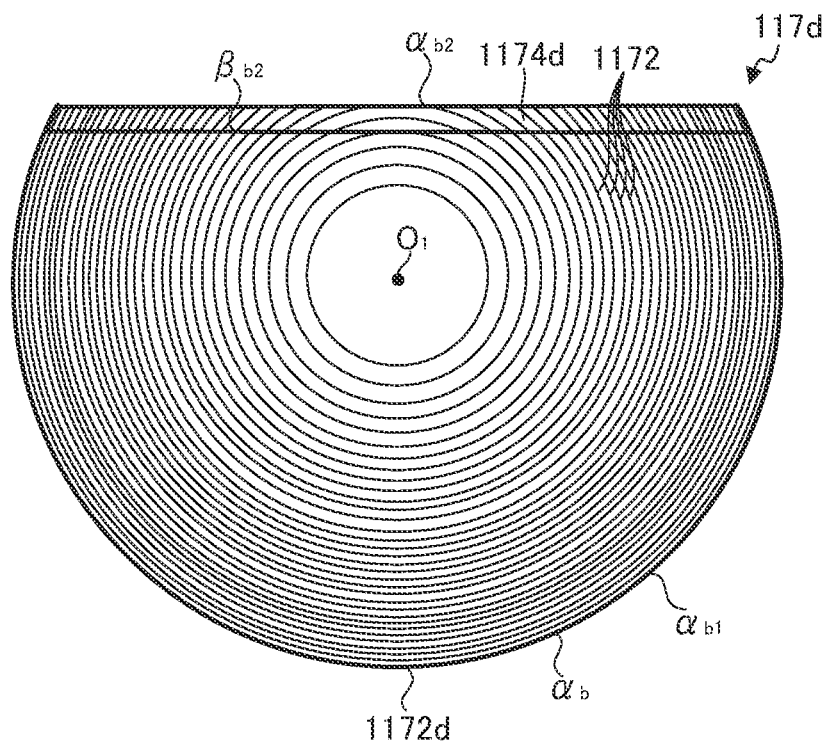
FIG. 12 is a schematic diagram to explain a lens according to Embodiment 5.

Embodiment 5 according to the present invention is described with reference to FIG. 12. A lens according to the present embodiment is different from the lens according to Embodiment 4 described above in structure of diffraction region 117d. Diffraction region 117d according to the present embodiment is described below while focusing on a part different from Embodiment 4.

A plan-view shape of diffraction region 117d according to the present embodiment is a partial circular shape larger than a semicircular shape. The structure of diffraction region 117d in the plan-view shape is described below. More specifically, outer edge $\alpha_b$ of diffraction region 117d includes first outer edge element $\alpha_{b1}$ having a semi-arcuate shape and second outer edge element $\alpha_{b2}$ having a linear shape.

Plurality of protruding strips 1172 of diffraction region 117d is coaxially formed around center $O_1$ of protrusion 1171. Plurality of protruding strips 1172 has an arc shape larger than a semicircular shape in a planar view in the thickness direction. Internal diameters of protruding strips 1172 are gradually increased as separating from center $O_1$ of protrusion 1171. In addition, distances among adjacent protruding strips 1172 are gradually decreased as separating from center $O_1$ of protrusion 1171.

In the present embodiment, center $O_1$ of protrusion 1171 and a center of diffraction region 117d are different from each other in the plan-view shape of diffraction region 117d.

Figure 13:
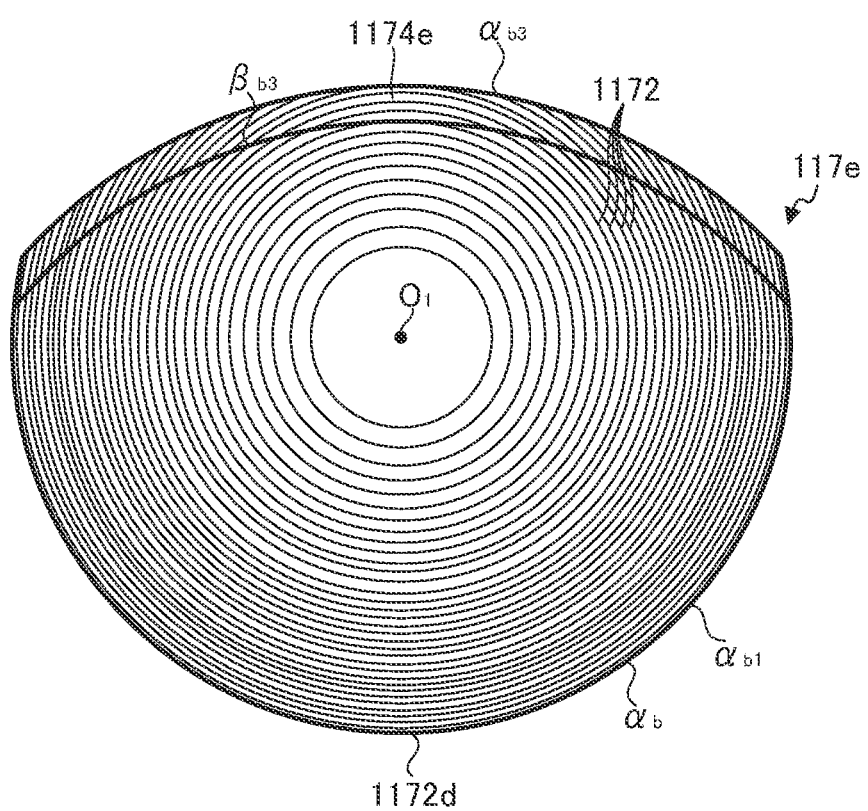
FIG. 13 is a schematic diagram to explain a lens according to a modification of Embodiment 5.

In the present embodiment, second diffraction region 1174d is provided in a part on an outer peripheral edge of diffraction region 117d along second outer edge element $\alpha_{b2}$. More specifically, second diffraction region 1174d is provided inside second outer edge element $\alpha_{b2}$ (side close to center of diffraction region 117d) and outside solid line $\beta_{b2}$ (side far from center of diffraction region 117d) in FIG. 12 in diffraction region 117d. Note that FIG. 13 illustrates Modification 1 of Embodiment 5 described above. In a case of diffraction region 117e according to Modification 1 illustrated in FIG. 13, second outer edge element $\alpha_{b3}$ is a curved line protruding to the outside of diffraction region 117e, in order to enhance visibility of the user. In this case, an inner end edge (solid line $\beta_{b3}$ in FIG. 13) of second diffraction region 1174e is also a curved line protruding to the outside of diffraction region 117e. The other configurations, action, and effects are similar to those according to Embodiment 4 described above.

APPENDIX

Note that examples of the eyewear include so-called glasses (including electronic glasses and sunglasses) and a goggle each including an auxiliary mechanism to improve eyesight of the user such as a vision corrective lens, and various devices (for example, glasses-type wearable terminal and head mount display) each including a mechanism to present information to a visual field or eyes of the user. In the above-described embodiments, electronic glasses 100 including paired lenses 110 for both eyes have been described; however, the eyewear according to the present invention is not limited to the aspect. It is sufficient for the eyewear to include a configuration that holds the auxiliary mechanism to improve eyesight or the mechanism to present information with respect to eyes by being worn by the user. Accordingly, the eyewear is not limited to of the glasses type mounted on both ears, and may be an apparatus mounted on a head or a single ear. Further, the eyewear may not be the eyewear for both eyes and may be an eyewear acting on a single eye.

Further, in the above-described embodiments, electronic glasses 100 including paired temples 140 each including detection section 142 have been described; however, the eyewear according to the present invention is not limited to the aspect. For example, one of the temples may only include a housing.

The disclosure of Japanese Patent Application No. 2017-020635, filed on Feb. 7, 2017, including the specification, drawings and abstract, is incorporated herein by reference in its entirety.

INDUSTRIAL APPLICABILITY

The lens according to the present invention can be suitably used as a lens for eyewear, which includes a liquid crystal material.

REFERENCE SIGNS LIST

10 Wiring
100 Electronic glasses (eyewear)

110 Lens
1101 First region (electrically active region)
1102 Second region
111 First transparent substrate
112 First transparent electrode
113 Liquid crystal layer
114 Second transparent electrode
115 Second transparent substrate
116 Bonding layer
117, 117', 117a, 117b, 117c, 117d, 117e Diffraction region
1171 Protrusion
1172, 1172a, 1172b Protruding strip
1173, 1173a First diffraction region
1174, 1174a, 1174c, 1174d Second diffraction region
1175 Groove space
1176 Protruding-strip absent part
1177 Communication space
1178 Planar part
1179 Groove
120 Frame
130 Front
131 Rim
132 Bridge
133 Nose pad
140 Temple
141 Housing
142 Detection section
150 Control section
160 Power supply
170 Blank portion
200 Lens blank

What is claimed is:

1. A lens, the lens comprising:
a substrate that includes a diffraction region where a plurality of protruding strips are coaxially formed, wherein:
the diffraction region includes a first diffraction region and a second diffraction region that is located in at least a part of a region different from the first diffraction region,
the second diffraction region includes groove spaces and a communication space, each of the groove spaces lying between adjacent ones of the protruding strips with one another, the communication space communicating between adjacent ones of the groove spaces with one another, and
at least a part of a virtual surface that is formed by connecting ridge lines of the protruding strips forming the communication space in the second diffraction region with each other has a groove shape.

2. The lens according to claim 1, wherein
the second diffraction region is located on a part including an outer edge part of the diffraction region.

3. The lens according to claim 2, wherein
a protruding-strip absent part is provided on an outside of the second diffraction region.

4. A lens blank, comprising:
a blank portion; and
the lens according to claim 1 formed integrally with the blank portion.

5. An eyewear, comprising:
the lens according to claim 1;
a frame that holds the lens; and
a control section that controls a voltage between a first transparent electrode of the lens and a second transparent electrode of the lens to control optical characteristics of the liquid crystal layer of the lens.

* * * * *